United States Patent
Ling

(10) Patent No.: US 8,793,748 B2
(45) Date of Patent: Jul. 29, 2014

(54) METHOD AND SYSTEM FOR CONTROLLING COMMUNICATION BETWEEN A USER DEVICE AND A CONTENT DELIVERY NETWORK

(75) Inventor: Sui-Ky Ringo Ling, Rancho Palos Verdes, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1954 days.

(21) Appl. No.: 11/828,551

(22) Filed: Jul. 26, 2007

(65) Prior Publication Data

US 2009/0031368 A1 Jan. 29, 2009

(51) Int. Cl.
*H04N 7/173* (2011.01)

(52) U.S. Cl.
USPC ............... 725/86; 725/25; 725/59; 725/61

(58) Field of Classification Search
None
See application file for complete search history.

(56) References Cited

U.S. PATENT DOCUMENTS

| | | | |
|---|---|---|---|
| 6,101,180 A | 8/2000 | Donahue et al. | |
| 6,259,891 B1 | 7/2001 | Allen | |
| 6,505,160 B1 * | 1/2003 | Levy et al. ............... | 704/270 |
| 6,591,306 B1 | 7/2003 | Redlich | |
| 7,327,258 B2 | 2/2008 | Fast et al. | |
| 7,433,320 B2 | 10/2008 | Previdi et al. | |
| 7,797,530 B2 | 9/2010 | Moineau et al. | |
| 2003/0007464 A1 * | 1/2003 | Balani ..................... | 370/310 |
| 2003/0009537 A1 * | 1/2003 | Wang ....................... | 709/219 |
| 2003/0069991 A1 * | 4/2003 | Brescia .................... | 709/245 |
| 2004/0057565 A1 | 3/2004 | Jones | |
| 2004/0078743 A1 | 4/2004 | Jensen et al. | |
| 2004/0187076 A1 * | 9/2004 | Ki et al. .................... | 715/513 |
| 2006/0209174 A1 | 9/2006 | Isaac et al. | |
| 2007/0058814 A1 | 3/2007 | Robinson | |
| 2007/0234398 A1 * | 10/2007 | Muehlbauer ............. | 725/145 |
| 2007/0281610 A1 | 12/2007 | Norin et al. | |
| 2008/0148361 A1 | 6/2008 | Norin et al. | |
| 2008/0172700 A1 | 7/2008 | Jensen et al. | |
| 2008/0178226 A1 | 7/2008 | Lee | |
| 2008/0178242 A1 * | 7/2008 | Eyal et al. ................ | 725/115 |
| 2009/0124664 A1 * | 5/2009 | Allegretti et al. ........ | 514/331 |

OTHER PUBLICATIONS

Rivest, R., The MD5 Message-Digest Algorithm, MIT Laboratory for Computer Science and RSA Data Security, Inc. Apr. 1992.*
Simpson, W. et al.; "PPP Challenge Handshake Authentication Protocol (CHAP)"; RFC 1994; Aug. 1996; IETF; pp. 1-13.

* cited by examiner

*Primary Examiner* — Pankaj Kumar
*Assistant Examiner* — Timothy Newlin

(57) ABSTRACT

A system and method for communicating between a content delivery network and a user device includes the user device generating a first request for a content file at a user device and communicating the request to the content delivery network. The content delivery network authenticates the first request, generates a redirection response and communicates the redirection response to the user device. The user device authenticates the redirection response, generates a second request for a content file in response to the redirection request and communicates the second request from the user device. The content delivery network communicates the content file from the content delivery network in response to the second request.

40 Claims, 13 Drawing Sheets

METHOD AND SYSTEM FOR CONTROLLING COMMUNICATION BETWEEN A USER DEVICE AND A CONTENT DELIVERY NETWORK

TECHNICAL FIELD

The present disclosure relates to a content processing and delivery system and, more specifically, to a system and method for controlling communication between a content provider and a user device.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast over the satellite. Once access is provided the user can access the particular content. The broadcasting of a large selection of channels and pay-per-view programs uses a considerable amount of satellite resources.

Content providers are increasingly trying to determine additional ways to provide content to users. Conveniently providing access to such content while preventing conflicts is important to providing revenue for content providers.

SUMMARY

The present disclosure allows a user device to communicate with a content delivery network.

In one aspect of the disclosure, a method includes generating a request for a content file at a user device, communicating the first request to a content delivery network, authenticating the request at the content deliver network, generating a redirection response at the content delivery network, communicating the redirection response to the user device and authenticating the redirection response at the user device. The method also includes generating a second request for a content file in response to the redirection request at the user device, communicating the second request from the user device to the content delivery network and communicating the content file from the content delivery network in response to the second request.

In yet another aspect of the invention, a system includes a content delivery network and a user device generating a first request for a content file at a user device and communicating the request to the content delivery network. The content delivery network authenticates the first request, generates a redirection response and communicates the redirection response to the user device. The user device authenticates the redirection response, generates a second request for a content file in response to the redirection request and communicates the second request from the user device. The content delivery network communicates the content file from the content delivery network in response to the second request.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
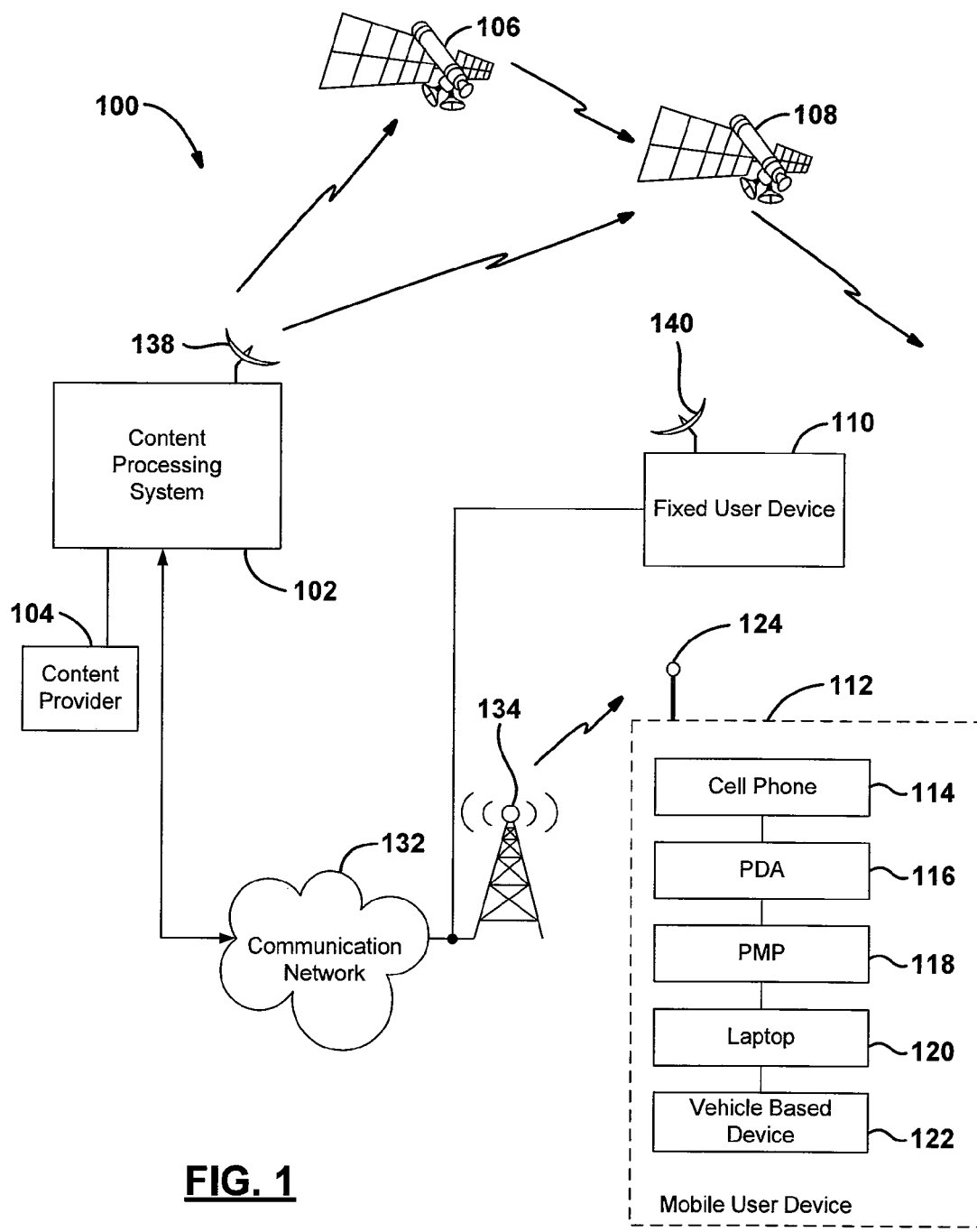
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system and a broadband system. The broadband distribution system may be implemented in a terrestrial system such as cable or telephone-type system. An optical fiber may also be used in the broadband system. Wireless distribution may also be used in the broadband distribution system.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs) or set-top box. Wireless communications are exchanged between the content processing system 102 and the fixed user devices 110 through one or more of the satellites 106, 108. The wireless communications may take place at any suitable frequency, such as, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Information or content provided to content processing system 102 from the media source 104 may be transmitted, for example, via an uplink antenna 138 to the satellite(s) 106, 108, one or more of which may be a geosynchronous or geo-stationary satellite, that, in turn, rebroadcast the information over broad geographical areas on the earth that include the user devices 110, 112. The satellites may have inter-satellite links as well. Among other things, the example content processing system 102 of FIG. 1 provides program material to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. To receive the information rebroadcast by satellites 106, 108, each for user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset can be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the IRD 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
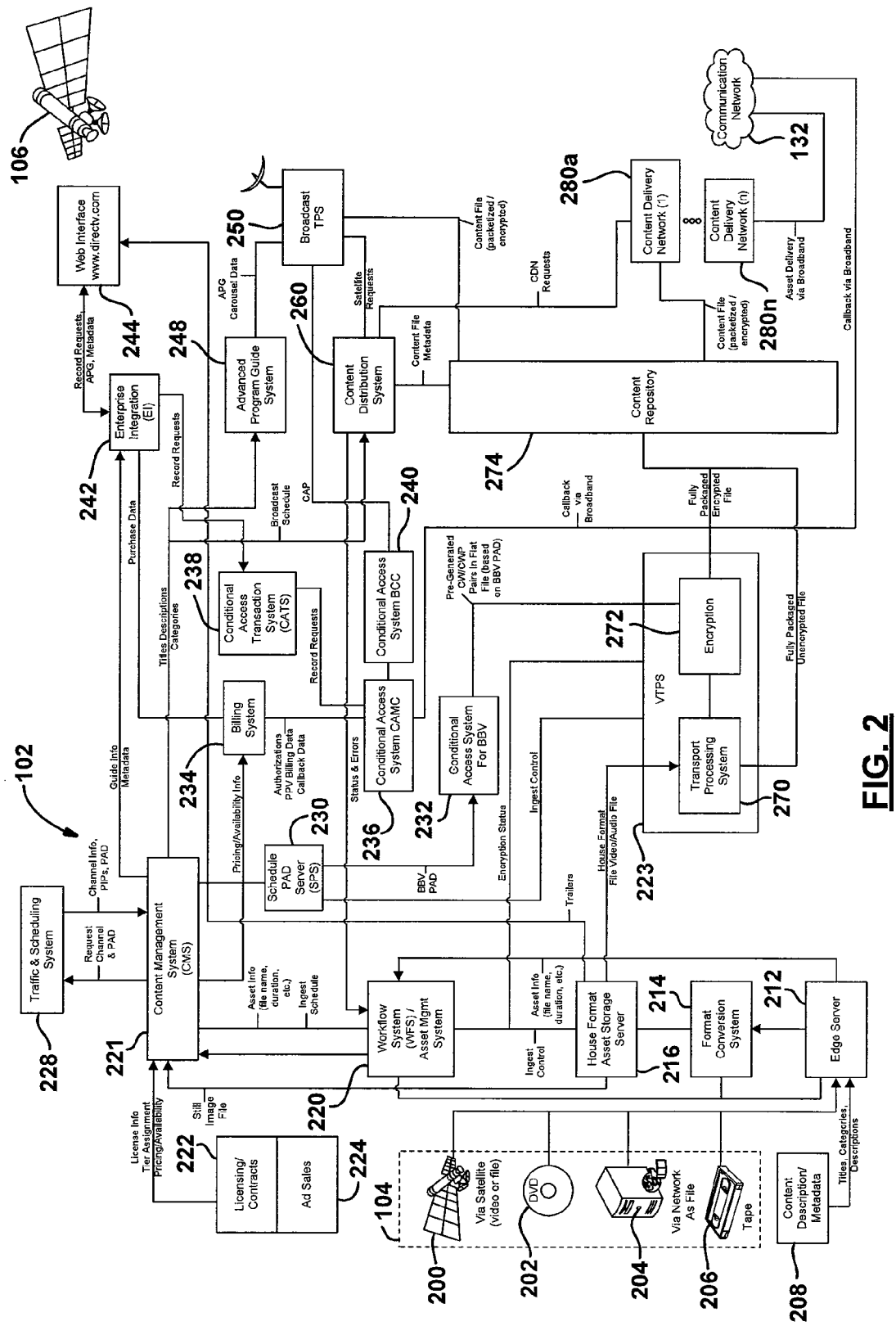
FIG. 2 is a detailed block diagrammatic view of the content processing system of FIG. 2.

Referring now to FIG. 2, the content processing system 102 of FIG. 1 is illustrated in further detail. The content provider 104 may include various types of content providers, including those that provide content by way of a satellite 200, DVD 202, via a network as a file in 204, by way of tapes and other means. The content provider 104 may also provide graphics, content description, and other metadata 208 to the system.

The content providers 104 may be various types of content providers and provide various types of content including advertising content such as row advertising (ads) is further described below. The content providers may provide various types of information including advertising information. Advertising providers may provide information on various products or various available or future content. It should be noted that the advertising provider and the content provider may be one and the same.

Information as to row ads may be provided by a content provider or an advertising provider. The row ads are ads that form a row or can take up a row or partial row in the program guide. Information received from the various providers may include various types of metadata, graphics, and the like. The metadata may also include location data as to where the row ad may fit as well as links to posters, asset or material identifications and various other links. Links provide a path to various other information. Links may also cause an action to be performed, such as tuning to a particular channel. The specifics of this will be described below.

The row ad metadata may include provider information that includes an identifier for identifying the content provided from the provider. A product identifier may also be included in the row ad metadata. An asset name stream may also be used to identify the asset. Major version numbers and minor version numbers may also be provided for the row ad content. A short description of the content may also be provided in the metadata. The creation date identifying the creation date of the content or row ad may also be provided in the metadata. A provider ID may also be formed. The provider ID may be various types of identification, including an internet domain name. An asset ID may be provided by the provider to identify the asset. A unique portable or material identification of the asset may be a combination of the provider ID and the asset identification. The material ID will be further described below in reference to the content management system which uses the material identification for various assets, including row ads. An asset class may also be assigned to the system. A verb may also be formed in the metadata. Verbs may include commands such as empty string and delete.

A link type may also be provided in the metadata that is used to identify a title of the asset, a channel or a homepage to which the row ad will link. The link type will also be described further below.

A link asset ID may also be included in the metadata. The link asset ID identifies the link from the row ad to the asset ID of the title asset. If the link is to a channel or homepage, this metadata may not be included.

Rollover text metadata may also be included in the system. The rollover text may appear when the particular row ad is highlighted by the user device. This string may include a phrase or other textual communication.

A text-only ad field may also be included in the metadata. A text-only ad includes merely a string of characters to be displayed. A text-only ad font may be used to change the font of the text-only ad. Various types of fonts, such as those commonly available in word processors, may be used. This may give the row ad a different look than the remaining portions of the program guide.

Content providers may also have a homepage within the present system. Briefly, the homepage is a portion of the program guide for selecting content to be downloaded to the user device. The system operator may also have its own homepage that has various categories of content. The categories and types of homepages will be described below.

The homepage may be formed in various configurations including a menu structure. The content providers may also provide various metadata for the menu structure or program guide.

Each provider may also have a home page within the system from which a user device may be used to select and navigate through the menu. Ultimately, a selection may be made and communicated from the user device back to the content distribution network (CDN), whereby the CDN provides the content to the user device. Content metadata used for identification may also be provided relative to the home page, and link the content to one or more home pages. The provider, product, asset name, version major, version minor, description, creation date, provider ID, asset ID, asset class and verb, as described above with respect to the row ad, may also be provided in the home page metadata. In addition, a home page construction type may be provided in the metadata. For example, the home construction type may use the wording "complete" to refer to images of posters, background and other information. The string "background" may only provide a particular background scene upon which graphics and other data is placed. The background and various aspects of the home page will be described below.

The metadata for the homepage may also include a home construct template that represents a template number that may be filled in by the various content providers. The operator of the content processing system may establish various homepage templates for which various information may be provided by the content providers to fill in the homepage. Various categories and the like may be filled in by the content providers within the various parameters of the various templates. This portion of the metadata may be used to identify the pre-made templates.

A poster art position metadata may also be provided by the content provider. Various poster positions, as will be described below, may be established by the content processing system. As will be described below, the posters may be used in a "complete" homepage construction type. The poster position identifies the poster art position and may include a variable to identify the template number and a number to identify the template and a number to identify the poster position.

A poster art position tab text may identify a tab text associated with the poster art position. One number associated with this metadata may include the template number and another number may identify the poster position. The value may be a string that is displayed at a certain position somewhere around or underneath the poster.

A promotional (promo) area title may also be included in the metadata. The promotion area title may specify the title to be shown in the promo area of the homepage. The promotional area may be an area defined within the template. This may also be set forth only in a complete.

The promotional area body may provide certain amount of characters or lines below the title in the promotional area of the homepage. There may be one or several promotional areas within a homepage.

A home page display start and a display end metadata field may also be provided. This may provide a start time and end time for displaying the fields. The start time and end time may correspond to the local time of the particular user device. That is, based upon the display start time and display end time and the local clock, the display may be changed accordingly.

Another area of the content processing system 102 is an input server 212 that receives the various content and converts the format in a format conversion system 214. A house format asset storage server 216 may be used to store the content asset in a house format. Still image files, trailers, and other information may also be stored in the house format asset storage server. A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The VTPS 223 may encode the packets containing the content. The encoder may encode the data into various transport formats such as DIRECTV® proprietary formats, or industry standard formats. The encoded data is then packetized into a stream of data packets by a packetizer 270 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets.

The content management system 221 generally controls the overall movement and distribution of contents through the content processing system 102. The content management 221 may also assign material identifications to the various received content. The material identification may utilize the asset identifier (ID) in the metadata as well as the provider ID. Content, posters and other received information may be assigned related material identifications to make them easier to associate and retrieve. For example, different suffixes may be used to identify related content with the remainder of the material identification being the same.

A licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

The Content Management System (CMS) 221 in combination with the SPS (230) is used to provide the requested channel, program associated data (PAD), channel information and program information packets (PIPs). The CMS 221 may schedule content processing for a plurality of received assets based on a desired program lineup to be offered by the communication system 100. For example, a live TV program for which a high demand for reruns might be expected could be assigned a high priority for content processing.

A schedule PAD server (SPS) 230 may be coupled to the CMS and is used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 (of FIG. 1) are charged for subscription services and/or asset downloads (e.g., PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed.

A billing system 234 receives pricing and availability information from the content management system 221. A conditional access system 236 receives callback information from the communication network 132. The conditional access system may be used to generate authorizations, pay-per-view billing data, and callback data from the billing system 234. Remote record requests may also be provided from the conditional access transaction system 238. A conditional access system BCC 240 may be used to generate a conditional access packet from the information from the conditional access system 236.

The billing system 234 may generate purchase data that is provided to the enterprise integration (EI) block 242. The enterprise integration block 242 may generate remote record requests to the conditional access transaction system 238. Remote record requests may be generated through a web interface such as DIRECTV.com® in block 244. Various ordering information, such as ordering broadband video, pay-per-view, and various services may be received at the web interface 244. Various trailers may also be accessed by the users through the web interface 244 provided from the house format asset storage server 216. Enterprise integration block 242 may also receive guide information and metadata from the content management system 221.

Content files may also be provided from the content management system 221 to the content distribution system 260.

The program guide data generated by the program guide system 248 may include information that is used to generate a display of guide information to the user, wherein the program guide may be a grid guide and informs the user of particular programs that are broadcast on particular channels at particular times. A program guide may also include information that a user device uses to assemble programming for display to a user. For example, the program guide may be used to tune to a channel on which a particular program is offered. The program guide may also contain information for tuning, demodulating, demultiplexing, decrypting, depacketizing, or decoding selected programs.

Titles, descriptions and categories may also be provided from the content management system 221 to the content distribution system 260. Content files and metadata may be controlled by the content distribution system 260.

Referring back to the video transport processing system 223, the video transport processing system 223 includes a transport packaging system 270. The transport processing system 270 creates pre-packetized unencrypted files. An encryption module 272 receives the output of the transport processing system and encrypts the packets. Fully packaged and encrypted files may also be stored in the content repository 274. Encryption may take place in the data portion of a packet and not the header portion.

One or more content delivery networks 280a-n may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

It should be appreciated that the content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hypertext transfer protocol (HTTP), etc. Each file received by the user device may be checked for completeness and integrity and if a file is not intact, missing, and/or damaged portions of the files may be delivered or downloaded again. Alternatively, the entire file may be purged from the IRD 110 and delivered or downloaded again.

The broadcast transport processing system 250 may provide various functions, including packetizing, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, program guide information or asset files, menus structures etc.) and/or live content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 280 can support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

Figure 3:
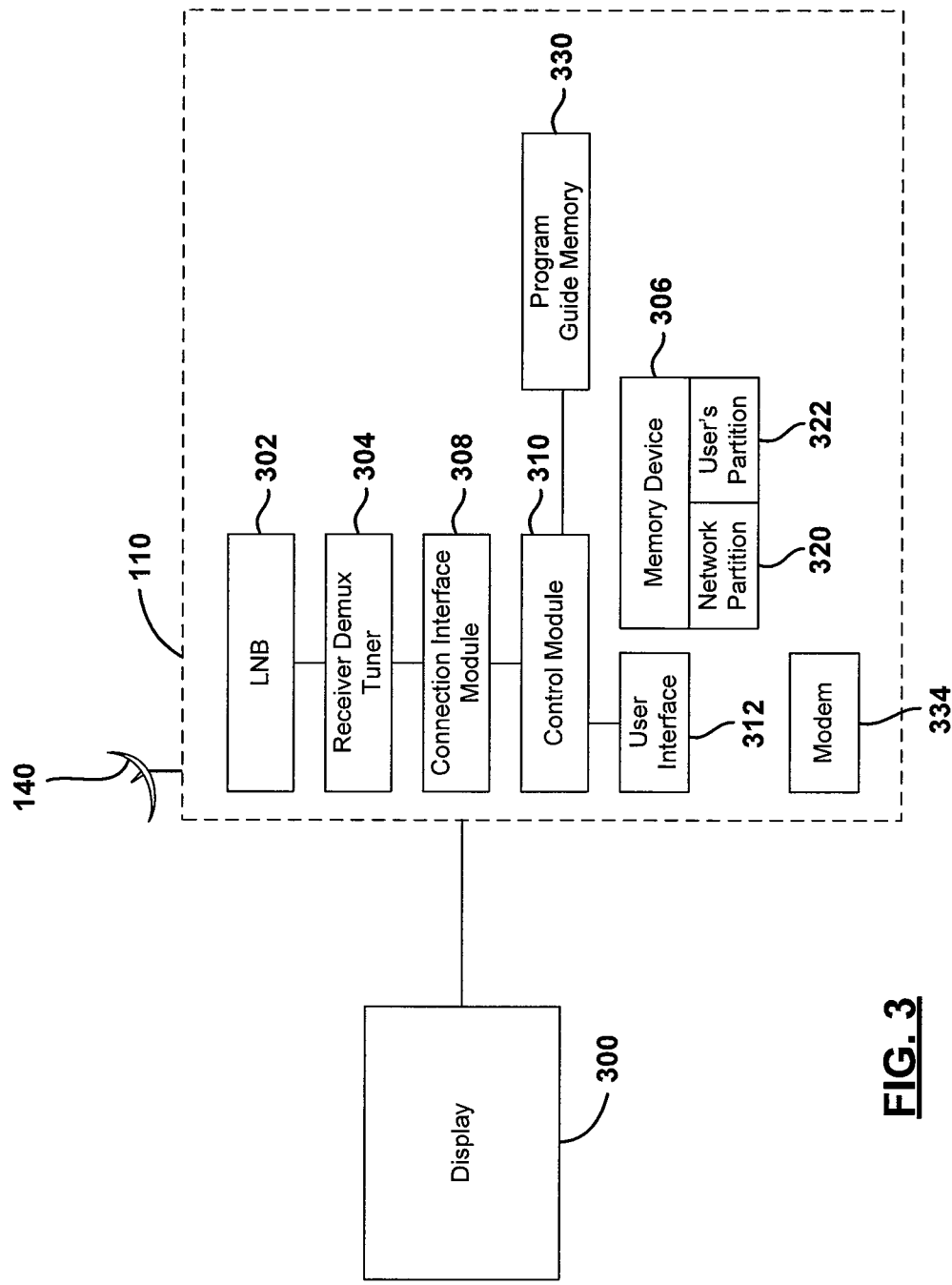
FIG. 3 is a detailed block diagrammatic view of the fixed user device of FIG. 1.

Referring now to FIG. 3, the user device 110 may be one of any variety of devices, for example, a set-top box, a home media server, a home media center (HMC), a personal computer (PC) having a receiver card installed therein, etc. A display device 300 such as a television set, a computer monitor, a portable media player or the like may be coupled to the user device. The user device 110 may be an integrated receiver decoder, a satellite television receiver or the like for displaying and/or playback of received programming.

The receive antenna 140 (124 on a mobile device) receives signals conveying a modulated multiplexed bitstream from the satellites 106, 108. Within the receive antenna 140, the signals are coupled from a reflector and feed to a low-noise block (LNB) 302, which amplifies and frequency downconverts the received signals. The LNB 302 output is then provided to a receiver 304, which receives, demodulates, depacketizes, demultiplexes, decrypts and decodes the received signal to provide audio and video signals to the display device 300 or a memory device 306, or both. The memory device 306 may be implemented separately from or within the user device 110. The receiver 304 is responsive to user inputs to, for example, tune to a particular program.

To store received and/or recorded programs and/or assets, the memory device 306 may include any of a variety of or combination of storage devices such as a hard disk drive, DVR, flash memory or other types of memory devices. The memory device 306 may be used to store the content, information, metadata, program guide objects and information and/or programs received via the satellites 106, 108 and/or the CDN 280. In particular, the packets stored on memory device 306 may be the same encoded and, optionally, encrypted packets created by the content processing system 102 and transmitted via the satellites 106, 108 and/or made available for download via the CDN 280.

The memory device 306 may also be a device capable of recording information on, for instance, analog media such as videotape or computer readable digital media such as a hard disk drive (HDD), a digital versatile disc (DVD), a compact disc (CD) and/or any other suitable media.

To communicate with any of a variety of clients, media players, etc., the illustrated example the user device 110 includes one or more connection interface modules 308 (e.g., USB, serial port, Firewire, etc.). The connection interface module 306 may act as a network interface that implements, for example, an Ethernet interface. The connection interface module 308 may be used for callbacks.

Each user device 110 may connect to the communication network such as the Internet 122 via any of a variety of technologies, for instance, a voice-band and/or integrated services digital network (ISDN) modem connected to a conventional PSTN, a wireless broadband connection (e.g., IEEE 802.11b, 802.11g, etc.), a broadband wired connection (e.g., ADSL, cable modems, etc.), a wired Ethernet connection (e.g., local area network (LAN), wide area network (WAN), etc.), a leased transmission facility (e.g., a digital signal level 1 circuit (a.k.a. a DS1), a fractional-DS1, etc.), etc. The format for communicating through the connection interface module 308 may be Internet Protocol (IP).

The user device 110 may also include a control module 310 that is used to control the operation of the various components within the user device.

A user interface 312 may, for example, be a set of push buttons or a remote control interface. The user interface 312 is used to make selections, input various data, and change the parameters of the user device 110. The user interface 312 may be used together with a graphical user interface displayed on the display device associated with the user device.

It should also be noted that the user devices 114 (device 110) may be configured in a similar manner to those illustrated in FIG. 3 through reference number 110. Such devices may include an internal antenna rather than an external dish-type antenna that is illustrated in the fixed device as 140. Also, external antennas are possible such as a phased array antenna.

The recording device 306 may also be partitioned into a network partition 320 and a user partition 322. Different types of content or assets may be stored in the network partition 320 or the user partition 322. The content stored in the different partitions may relate to the tier of the content. This will be further described below.

A program guide memory 330 may also be included in the device. The program guide memory 330 may be used to store program guide information and homepage information for the linear and virtual channels. The program guide memory 330 may be implemented as a non-volatile memory such as flash memory. The program guide memory 330 may thus be a separate memory device. Memory device 330 may also be integral with recording device 306.

The user device 110 may also include a modem 334 for communicating callback information to a head end or content processing system through a telephone connection. As will be described below, the modem may be used if callbacks cannot be made after attempting a callback using the connection interface module.

Figure 4:
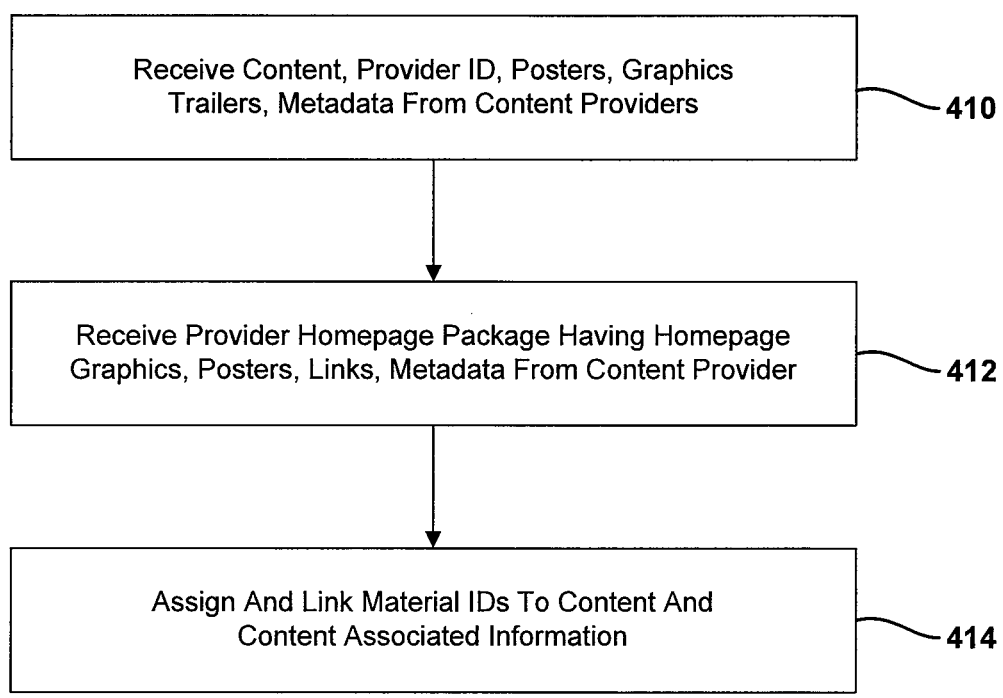
FIG. 4 is a flowchart illustrating a method for linking content and content-associated information.

Referring now to FIG. 4, a method of assigning material identifications to various content and content-associated information is set forth. In step 410, content is received from various content providers. The providers may provide a provider or asset identification (ID) for the content provided. Posters, trailers, graphics, metadata may also be received from content providers. The content and the other content-associated information may be received in different ways or the same way. When received in different ways, they may be associated together in the content processing system. In step 412, the content providers may also provide a homepage package having the homepage graphics, posters, links and metadata from the content provider. The types of metadata that may be received from the content providers were described above in FIG. 1.

In step 414, the material identification is assigned to the content and to the content-associated information. This step may be performed in the content management system of FIG. 2. Preferably the material ID and the associated content information are linked together. As mentioned above, one way to link the content with the content-associated information is to provide a common material identification with various suffixes to identify the various information.

Figure 5:
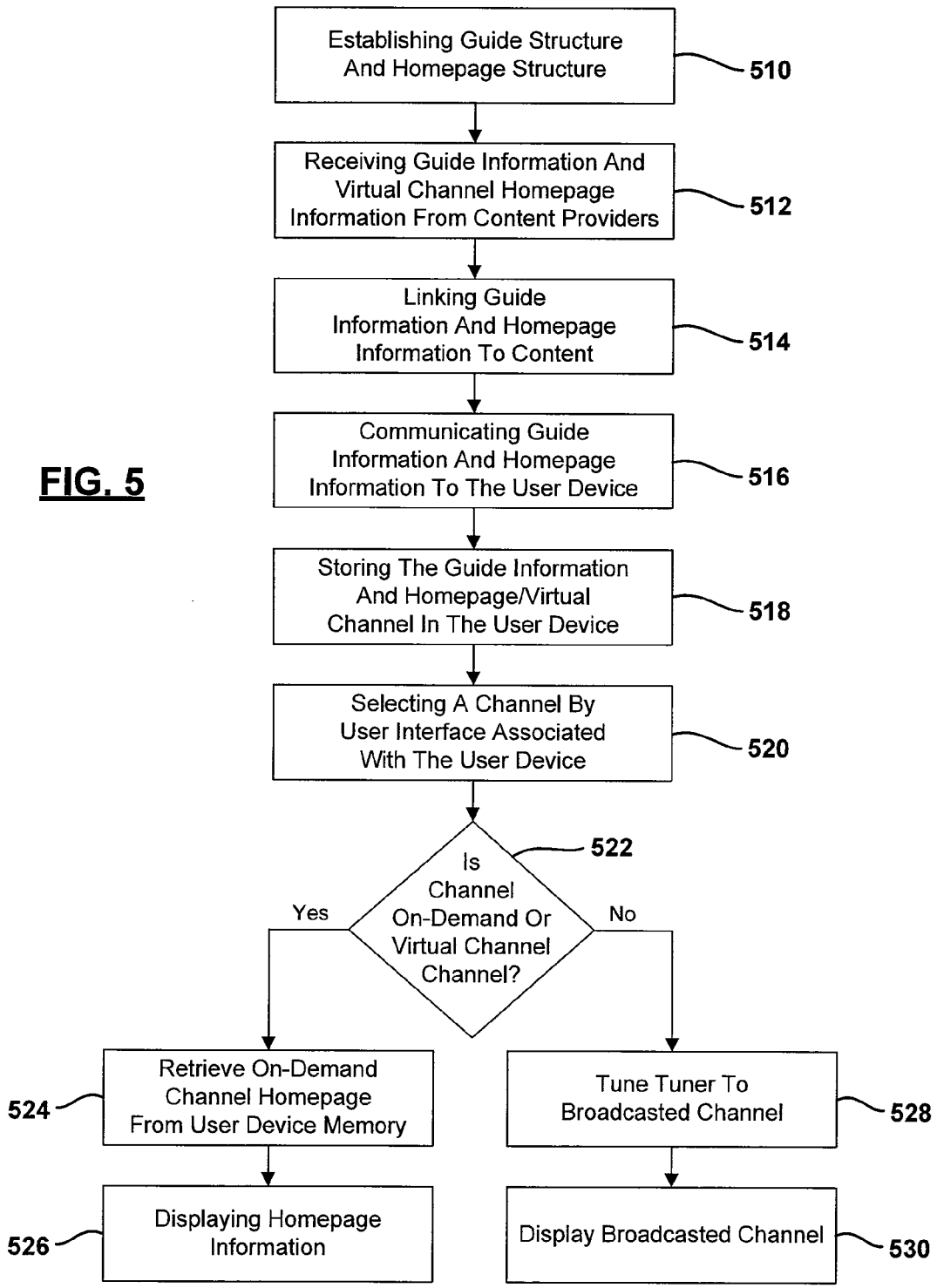
FIG. 5 is a flowchart of a method for selecting channels from a user device.

Referring now to FIG. 5, the data or information received by the user device may be used to populate a guide or menu structure. In step 510, the content processing system establishes various guide structures and homepage structures. These may be referred to as templates. The templates may correspond to the physical layout of the screen display on the user device. Virtual channels have homepages that have content to order in an on-demand or request-based manner. Linear channels, in contrast, are normally broadcast network channels that communicate on program or content after another in real time. Virtual channels may also be associated with a network but are not real time. Content is communicated to the user device only when requested.

In step 512, the guide information and virtual channel or homepage data is received from content providers. The guide information or homepage data may be received in various manners as described above. In step 514, the guide information and homepage information or data is linked to the content. The material identification may be used in the linking. In step 516, the guide information is communicated to the user device. The guide or homepage data may be communicated using separate or the same communication means. The guide information and homepage information may be communicated in various ways, including through the terrestrial system, broadband communication system, satellite or the like. The guide information may also be referred to as objects. The guide information and homepage may be program guide information or separate menus that are reachable from the program guide information. Guide information and homepage information may be continuously broadcast at various times throughout the day so that the guide information may be updated. The guide information may be stored in the memory of the user device and displayed on request.

In step 518, the guide information and homepage information are displayed in the associated structure using the associate template. The guide information or homepage information may also be in the form of a menu structure that also uses various templates. The content information may also include the metadata as described above. The metadata may provide various ratings and the like for the particular content. A material identification may be associated with various selections in the program guide or virtual channel homepage.

In step 520, a selection of a channel is performed using a user interface associated with the user device. The user interface may be a remote control in communication with the user device or push buttons on the user device. It is also possible that a graphical user interface may be used for selecting a channel. Selections may be made in response to the program guide structure or menu structure.

In step 522, if the channel is an on-demand or virtual channel step 524 is performed. In step 524, the on-demand or virtual channel homepage is received from the user device memory. In step 526, the homepage or virtual channel information is displayed.

Referring back to step 522, if the channel is not an on-demand or virtual channel, step 528 is performed. In step 528, the tuner is tuned to the broadcasted linear channel. In step 530, the broadcasted or linear channel is displayed in association with the user device. The user device is a hand-held device whose channel may be displayed on the user device. If the user device is a satellite television set top box, the user device may be coupled to a separate display such as a television.

Figure 6:
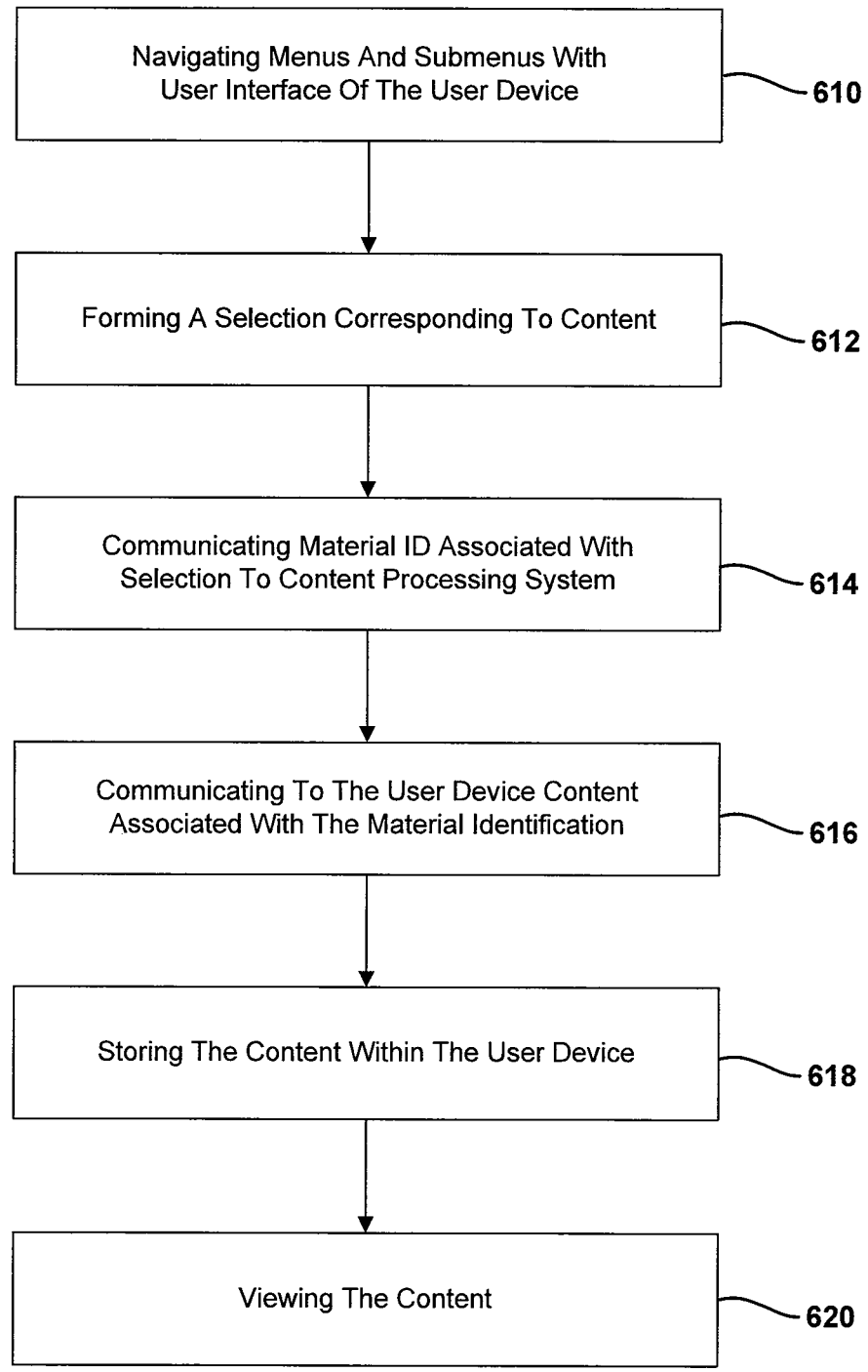
FIG. 6 is a flowchart of a method for selecting content from a user device.

Referring now to FIG. 6, from the user device the various menus, sub-menus and program guide may be navigated in step 610 using the user interface illustrated in FIG. 3. In step 612, once a particular menu with a particular content selection is reached, a selection may be formed that corresponds to content. The selection may select a material identification (ID) that is received with the metadata. In step 614, the material ID associated with the selection is communicated to the content processing system. The communication may take place using a terrestrial system such as a broadband system, a wireless broadband system, or other types of communication systems described above.

In step 616, the content associated with the material identification, is communicated to the user device. In step 618, the content may be stored within the user device. This step may also be an optional step. In step 620, the content may be viewed from the memory device or directly as the content is received. It is envisioned that a commercial embodiment will store the content as it is received. It is also envisioned that the content may be stored while the content is being played from the beginning of the content file.

Figure 7:
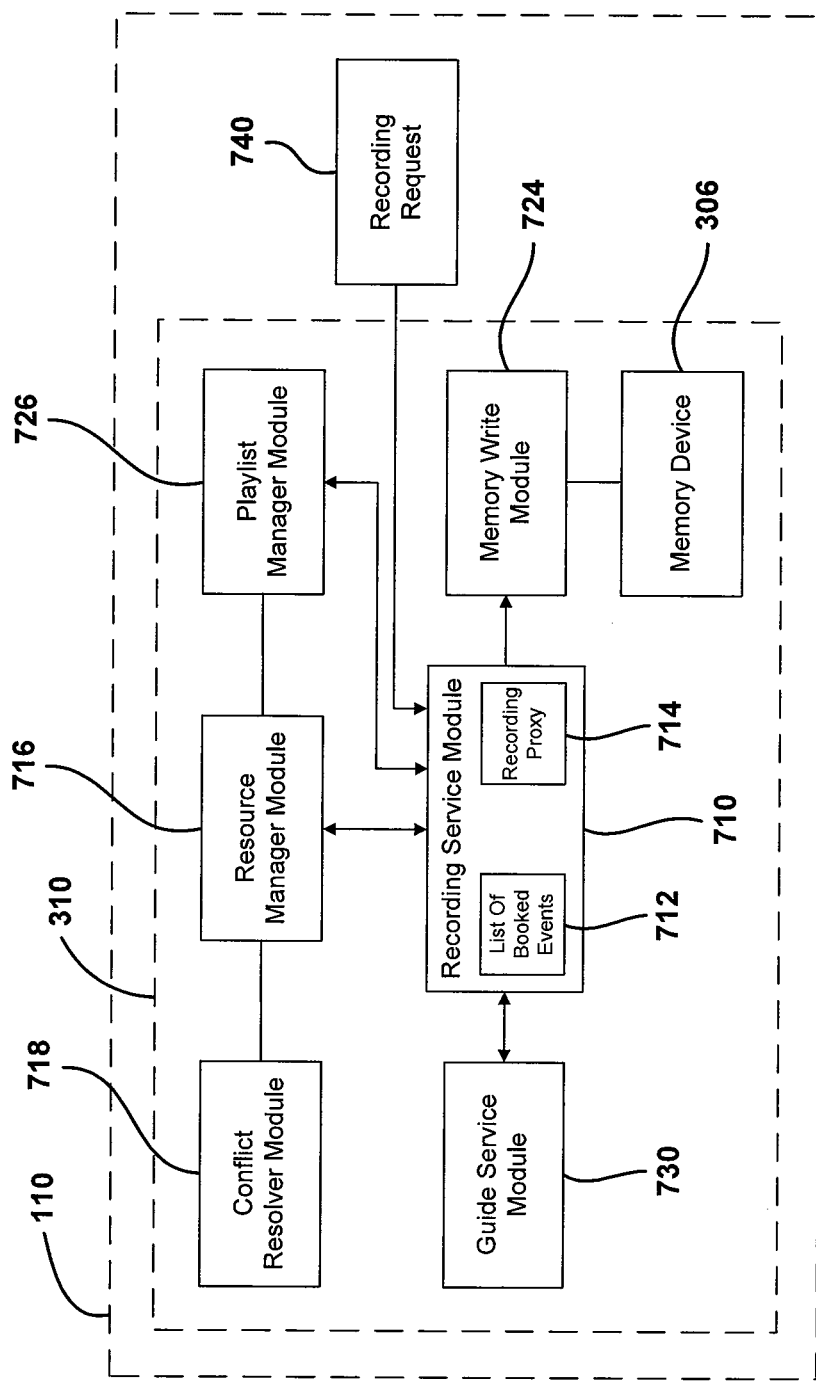
FIG. 7 is a block diagrammatic view of a control module of a user device.

Referring now to FIG. 7, the control module 310 of the user device 110 is illustrated in further detail. The control module 310 includes various control modules that are used to control the recording of a particular event or programming content. A recording service module 710 includes a list of booked events 712 and a recording proxy 714. The recording service module 710 coordinates the recording as will be further described below. The recording service module 710 receives booking and recording requests from the set top box. The recording service module 710 makes a determination of the events to record from the responses received from a resource manager module 716 and a guide service module 730. The recording service module 710 may also receive booking requests from a local IP network. The local IP network may include other user devices within the same household. The recording service module 710 interfaces with the resource manager module 716 to resolve scheduling conflicts for requested events. The recording service module 710 interfaces with the resource manager 716 to reserve the necessary resources for recording a requested event. The recording service module 710 maintains a conflict-free list of pending booked events and synchronizes the list across clients and servers in the home media network. The conflict-free list of booked events is set forth at 712 in the recording service module. The recording service module 710 links the events in the pending list to the resources reserved and managed by the resource manager module 716. The recording service module 710 manages the content stored on the local drive and removes content when the drive reaches capacity. The recording service module 710 also stores the metadata necessary for the viewer to view and purchase a recording. The recording service module 710 initiates the recording of a booked event at the scheduled start time and for the scheduled duration. The recording service module 710 also processes and updates the scheduled start time and duration for booked events when the program guide database is updated. The recording service module 710 also updates the manager module 726 with events that are available for viewing.

The recording service module 710 may perform various recordings including the recording of mandatory and optional software downloads, recording single event recording, performing recurring event recording, performing opt-in recording, performing network-scheduled or push recording, manual recording, performing recurring manual recordings, finding various recordings, recording extensions, deletion of booked events, and prioritization of recurring events.

The recording service module 710 is in communication with the resource manager module 716 that is used to control the resource allocation for the user device. The resource manager module 716 is coupled to a conflict resolver module 718 that resolves conflicts between the recording of various schedules.

The recording proxy 714 of the recording service module 710 is in communication with a memory write module 724 that communicates and writes various information to the memory device 306. The memory write module 724 may be a digital video recorder write module.

The recording service module 710 is also in communication with a play list manager module 726. The play list manager module is used to manage the play list for the user device. The play list is a list of the content available for playback.

The recording service module 710 is in communication with a guide service module 730. The guide service module receives advance program guide information and communicates the information or data to the recording service module 710.

A recording request 740 may be used to generate information to the recording service module. The recording request may generate a booking and recording request from the remainder of the user device 110. The recording request may include various types of information including a material ID or the like used for identifying the particular content selected. Push buttons or other types of user interfaces may be used to provide this information.

Figure 8:
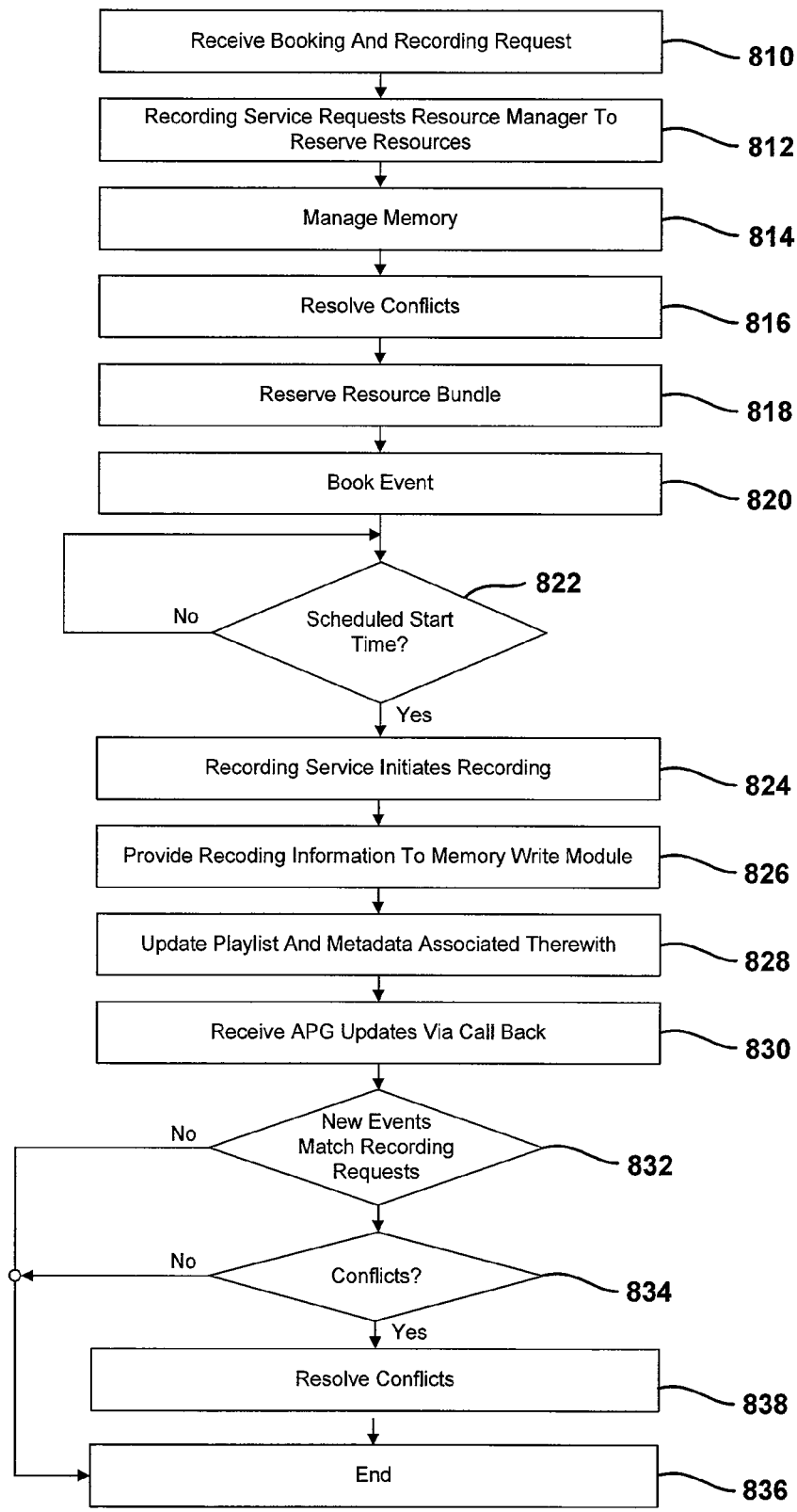
FIG. 8 is a flowchart of a method for operating a control module of a user device.

Referring now to FIGS. 7 and 8, a method for operating the control module 310 of FIG. 7 is illustrated. In step 810, a booking and recording request is generated within the user device and provided to the recording service module 710. The recording service module 710 requests the resource manager 716 to reserve resources in step 812. It should be noted that the recording service module 710 may coordinate with other recording service modules located within a household on a single network.

In step 814, the memory device 302 may also be managed with the memory write module 724. The recording service module 710 may be used to remove old or expired content from the memory device 302 to free up space therein. Managing the memory may also remove lower priority items versus higher priority items. Low priority items may be removed to make room for higher priority content to be recorded.

In step 816, the conflict resolver module 718 is used to resolve conflicts between the booking and recording requests and any other previously booked requests. To resolve conflicts, the priority or desirability of various requests may be provided. For example, a user may indicate that a particular request has the highest priority and thus any previously scheduled recording at the particular time may be discontinued.

When no conflicts exist, the resources associated with the particular booking and recording requests are reserved. This may entail reserving a resource bundle such as a video pipe line that includes a tuner, demultiplexer and the necessary space within the memory device 306. The event is booked when no conflicts exist, or all conflicts are resolved (either automatically or by the viewer or user) and the resources necessary for the recording are reserved. The booked events are listed in the list of booked events 712. The list of booked events is a conflict-free list of booked events. The recording service received information from the guide services module as to the program information packets, the copy guard management system values, the rating information and the program title and stores this information in the list 712. If the guide service is unable to retrieve a program information packet (PIP) for that event, then the recording service manager may retrieve this information from the program information packet stream provided by the guide service module 730 at the time of recording.

The recording service module 710 may initiate a recording of the booked event at the scheduled start time for a specific duration in step 822. The user device may include a local time that is used to initiate the starting of the event. By comparing the scheduled start time and the local time associated with the user device, the recording service module 710 initiates recording in step 824. The recording service module 710 provides the recording information such as the program information packet, the rating information and copy guard management system (CGMS) values to the write module 724 at the scheduled event start time in step 826. The write module 724 will store this metadata in the metadata indexer at recording time.

The recording service module 710 updates the play list manager module 726 with the events that are available for viewing in step 828. This information may be provided through a screen display to the user of the user device. An event may be available for viewing when the recording begins unless the event is a network scheduled recording. The network scheduled recording may be referred to as a push event. Push events may not be available until after the recording event is complete. The recording service module 710 may also pass the metadata to be associated with the event. The play list manager may store the metadata until the event is deleted in step 828.

In step 830, the recording service module 710 may receive advanced program guide (APG) updates from the guide service module 730 either from the satellite or by a callback mechanism. When the APG update is received, the recording service may attempt to search for and book new events that match the recording request and determine of the updated event causes scheduling conflicts with existing bookings. If new events match the recording request in step 832 and no conflicts exist in step 834, the system ends in step 836. If in step 832 no new events match the recording request then the system ends in step 836. In step 834, if conflicts do exist, step 838 resolves the conflicts. The recording service module 710 may book lower priority events that are cancelled due to the conflict resolution process. The recording service module 710 may manage all the material on the user device including removing content when the drive reaches capacity on a priority or quota basis or when content is flagged to expire by a specific date. The recording service module 710 may also notify the play list manager and the write module 724 at the time of content deletion allowing the associated metadata to also be deleted.

Figure 9:
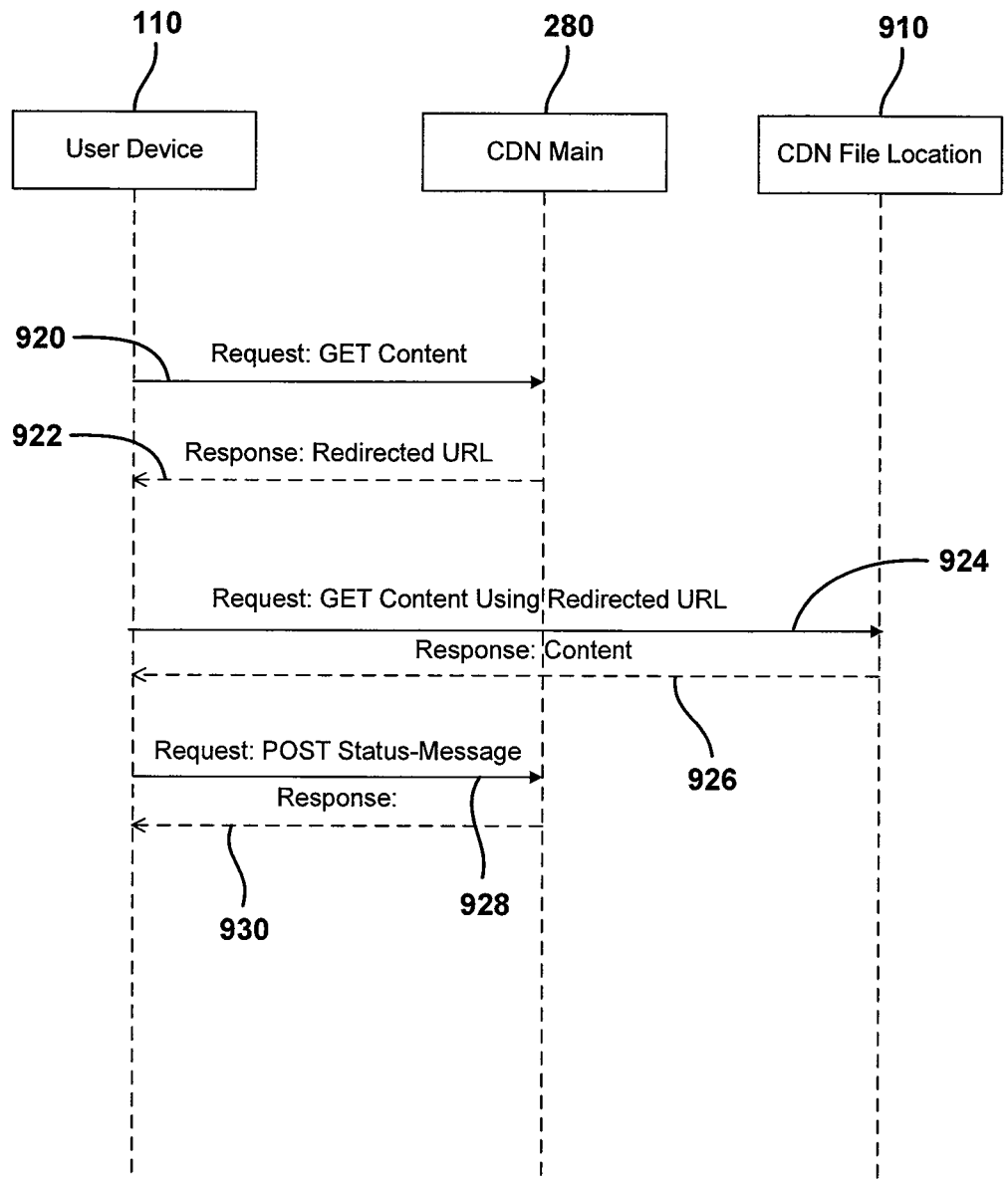
FIG. 9 is a flowchart of a first method for interaction between a user device and a content delivery network.

Referring now to FIG. 9, a flowchart illustrating the operation of the interaction between a user device 110 and a content delivery network (CDN) 280 is illustrated. The interaction with a file location 910 within the content delivery network 280 is also illustrated. In step 920, the user device 110 requests a content file using a uniform research locator (URL). The URL may include a fixed host name of the content delivery network, a directory and file identifier. The file identifier may be the material identification described above. The content delivery network 280 may respond with a redirected uniform research locator with a cryptographic hash and size of the content file, if the request is authenticated by the content delivery network. A suitable algorithm for the cryptographic hash is MD5. The cryptographic hash is used in authentication. In step 924, the user device may request the content file using the redirected uniform research locator. This step may be performed after the user device authenticates the response from the content delivery network. The response is communicated to the CDN file location 910 and the response to the second request may include the content itself in step 926. In step 928, the user device may generate a status message such as "Download Completed" or a "Download Failed" message if the download has not been completed. In step 930, the content delivery network 280 may provide a response to the status message.

Figure 10:
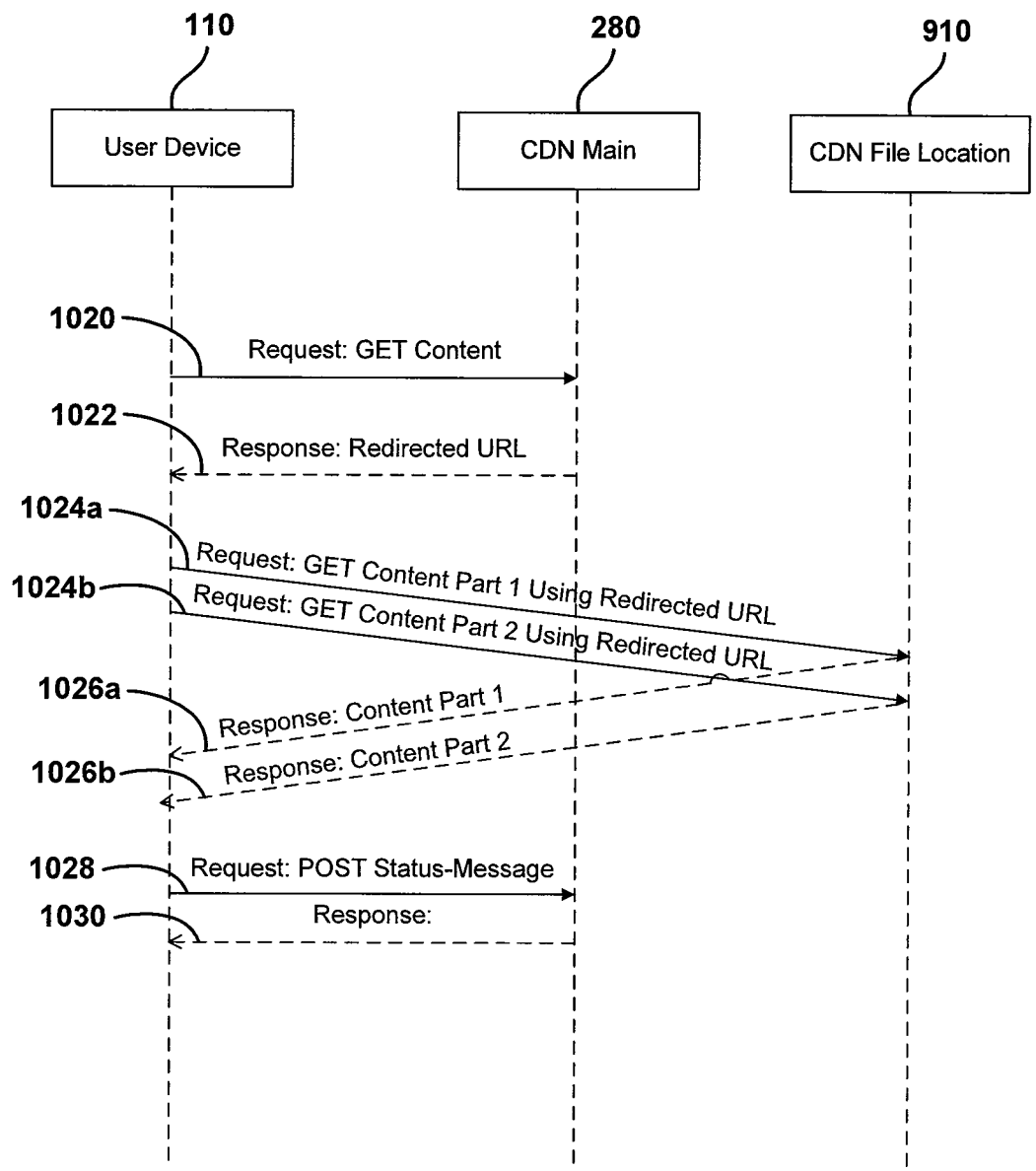
FIG. 10 is a flowchart of a second method for interaction between a user device and a content delivery network.

Referring now to FIG. 10, a second method for requesting content from a user device 10 from a content delivery network 280 may be performed. In this process, the content may be downloaded or communicated in parallel from the CDN 280 to the user device in response to multiple requests from the user device 110.

In step 1020, a similar process to that described above in step 920 of FIG. 9 is illustrated. In this step, the user device 110 requests a content file that may include the fixed host name, directory and file identifier. In step 1022, the content delivery network 280 may respond with a redirected URL with a cryptographic hash and size of the content file. This response may be performed after the request from the user device is authenticated.

In step 1024, the user device 110 may determine a number of parallel downloads based on the size of the content file and issue multiple requests for portions of the file in parallel. Each request may correspond to a portion of the content file and, in particular, to a byte range of the content file. Steps 1024a and 1024b correspond to multiple requests for the content. The content delivery network 280 and, in particular, the content delivery network file location 910 responds with multiple content portions in step 1026a and 1026b.

Steps 1028 and 1030 with respect to a status message are identical to steps 928 and 930 above.

Should an error occur during download, an error message may be displayed to the user and also communicated to the content delivery network 280. This may interrupt the processes in FIGS. 9 and 10. For example, if an incorrect hash value is provided from the user device to the content delivery network, an "unauthorized" message may be generated by the content delivery network.

Figure 11:
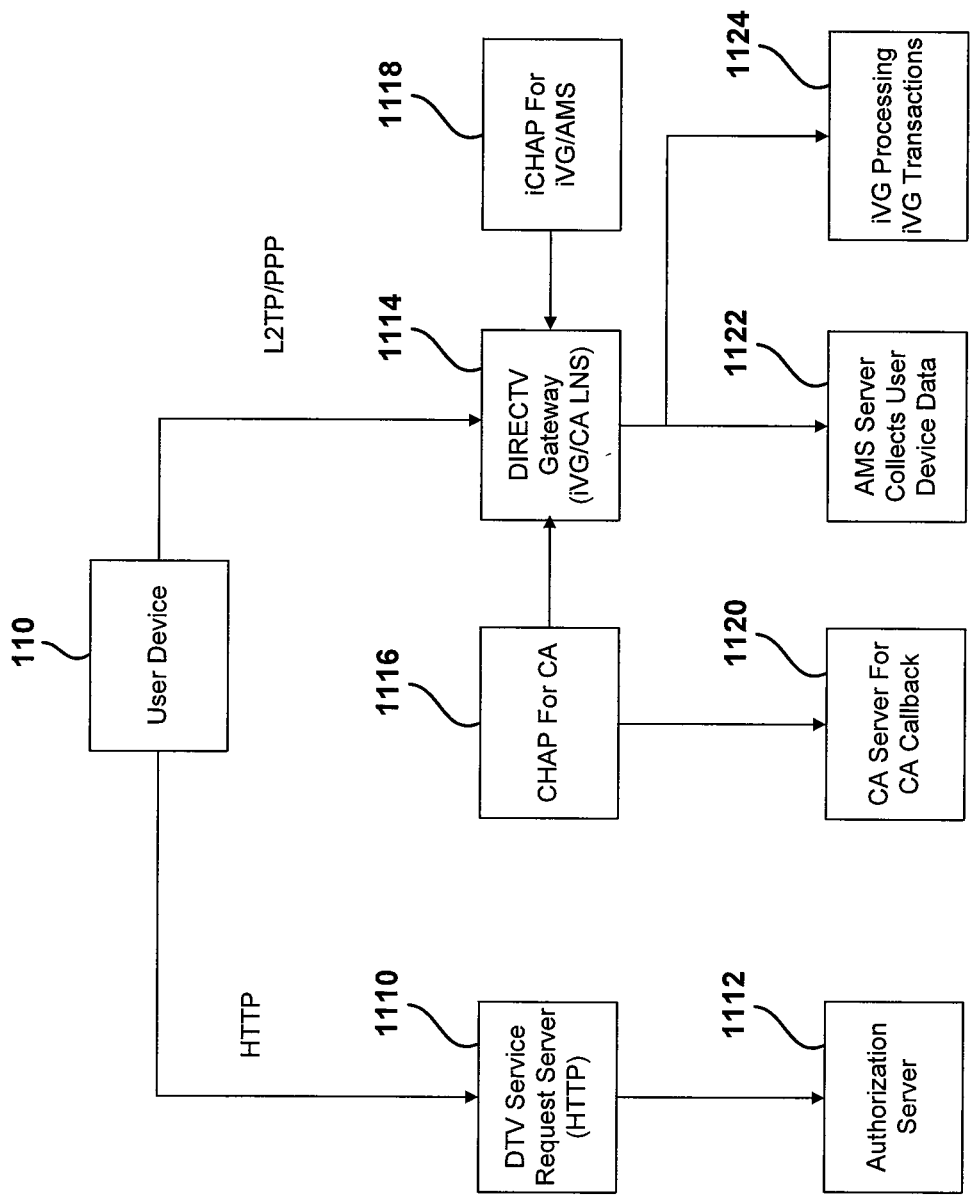
FIG. 11 is a block diagram of a first embodiment of a user device coupled to a gateway system.

Referring now to FIG. 11, the user device may be coupled to the DIRECTV® or system provider gateway system so that callbacks may be provided through a broadband network. The user device 110 may be coupled to a DIRECTV® service request server 1110 which in turn is coupled to an authorization server 1112.

The user device 110 may also be coupled to the DIRECTV® gateway 1114 that is used to provide conditional access (CA), interactive video guard (iVG) information and audience measurement system (AMS) data. In prior DIRECTV® systems, a telephone modem is used to provide the callback messaging. This embodiment allows the Internet protocol (IP) to be used for callbacks. Conditional access management data that connects back to the DIRECTV® CAMC by way of the gateway 114 the LNS server is a look "and" stop server that acts as a firewall.

The DIRECTV® gateway 1114 may be provided with challenge handshake authentication protocol (CHAP) information for conditional access in box 1116. Audience measurement system (AMS) and interactive CHAP 1118 may also be provided to the DIRECTV® gateway 1114.

The DIRECTV® gateway 1114 may couple various information to the conditional access server 1120 for conditional access callback to the audience measurement system server 1122 that collects user device data. The DIRECTV® gateway 1114 may also be coupled to the video guard processing and transaction block 1124.

Communication between the user device 110 and the DIRECTV® gateway 1114 may use an L2TP together with point-to-point video protocol. L2TP stands for layer 2 tunneling protocol that may be used to support a virtual private network.

Figure 12:
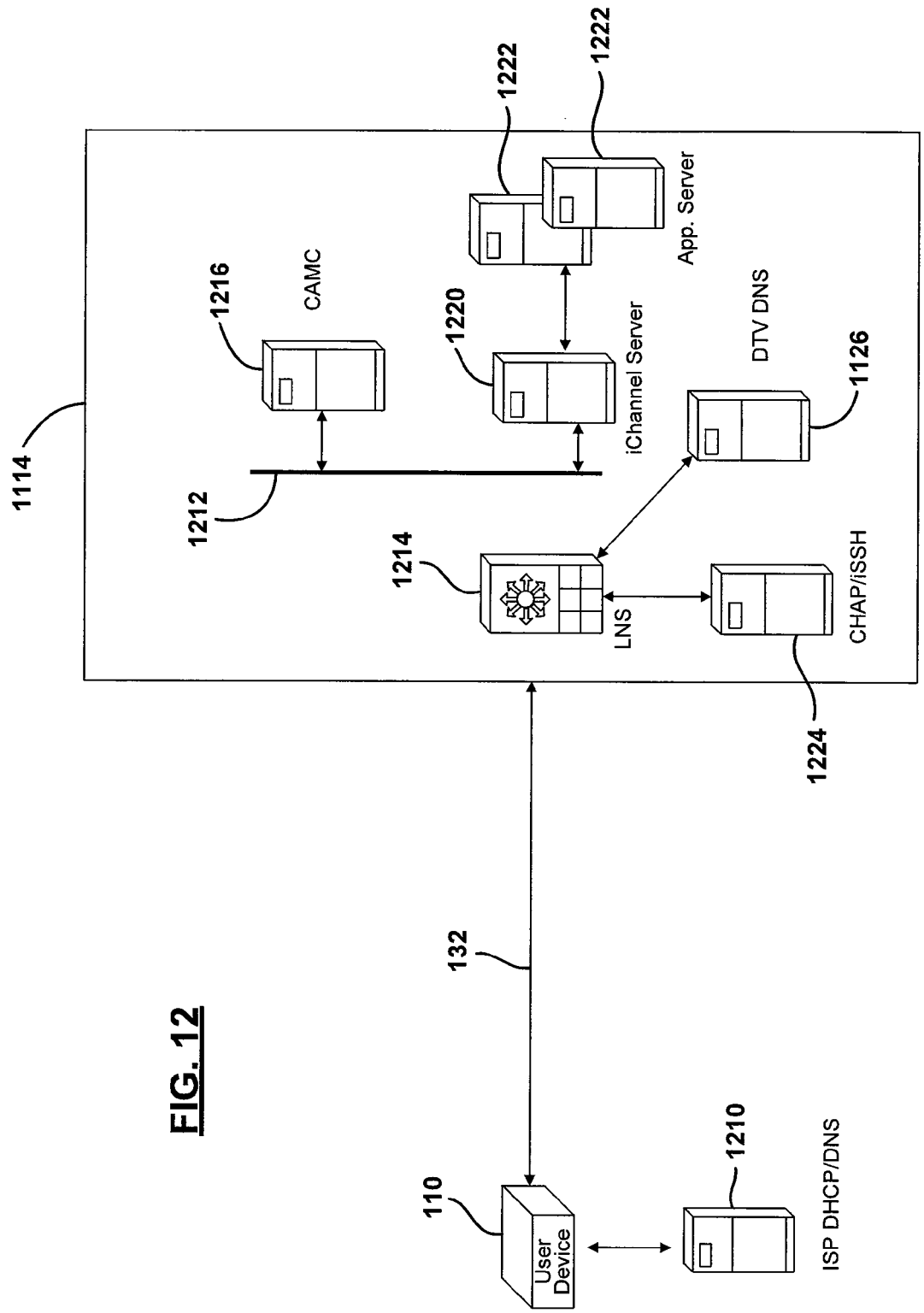
FIG. 12 is a block diagram of a second embodiment of a user device coupled to a gateway.

Referring now to FIG. 12, a domain name server 1210 is illustrated in communication with the user device 110. The communication network 132 such as a broadband (wired or wireless) communication network is illustrated. The DIRECTV® gateway 1114 is illustrated in further detail. The DIRECTV® gateway 1114 includes an LNS server 1214 that is used to couple to the communication network 132. A bus 1212 may have various devices such as the conditional access management center (CAMC) 1216 and an iChannel server 1220 coupled thereto. Various application servers 1222 may be coupled to the iChannel server 1220. The LNS server 1214 may be coupled to a challenge handshake authentication protocol (CHAP) server 1224. The server 1224 may also be implemented as a secure shell (SSH) server. A DIRECTV® domain name server 1226 may also be coupled to the LNS server 1214.

Figure 13:
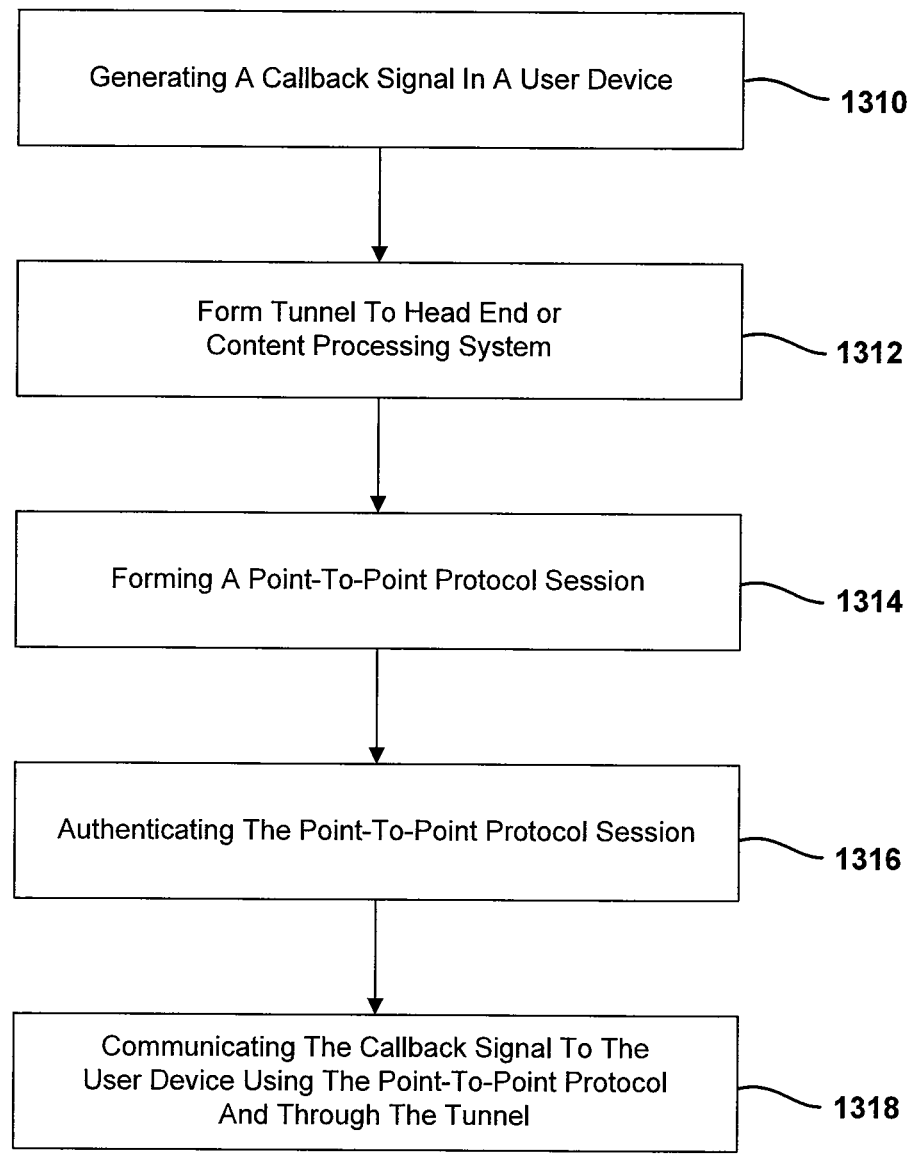
FIG. 13 is a flowchart of a method of operating a callback system.

Referring now to FIG. 13, a method of operating the callback system is illustrated. In step 1310, a callback signal is generated in the user device. The callback signal may be various types of signals including, but not limited to, a conditional access signal, an audience measurement signal or a video guard signal.

In step 1312, a tunnel may be formed between the head end or content processing system and the user device. The Layer 2 Tunneling protocol (L2TP) may be used to form the tunnel. The L2TP protocol tunnels network traffic between two computers over an existing network such as the Internet. In this embodiment the user device and the gateway or DIRECTV® head end are coupled together using the broadband communication network. As was described above, the broadband network may be the Internet. The broadband network may include a wireless broadband network.

After forming a tunnel, a point-to-point protocol session may be established between the user device and the DIRECTV® gateway or head end in step 1316.

In step 1318, the callback signal is communicated between the user device using the point-to-point protocol through the tunnel. As mentioned above, various signals and interactions may take place between the user device and the head end or gateway. Should the user device be a wireless device, a wireless broadband network may be used. Should the device be a fixed device, such as a satellite TV set top box, either the wireless or a wired connection may be formed in the communication.

As mentioned above, IP protocol may be attempted for communicating callback information or data. If the IP network is unable to connect the user device and the content processing system or the head end, then the modem may be used to communicate callback information or data.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
generating a first request for a content file at a user device;
communicating the first request to a content delivery network;
authenticating the first request at the content delivery network;
generating a redirection response at the content delivery network;
communicating the redirection response to the user device;
authenticating the redirection response at the user device;
generating a second request for the content file in response to the redirection request at the user device;
communicating the second request from the user device to the content delivery network; and
communicating the content file from the content delivery network in response to the second request.

2. A method as recited in claim 1 wherein generating a first request comprises generating the first request using a Uniform Resource Locator (URL).

3. A method as recited in claim 1 wherein generating a first request comprises generating the first request using a URL having a hostname and file identifier.

4. A method as recited in claim 1 wherein generating a request comprises generating the first request using a URL having a hostname, directory and file identifier.

5. A method as recited in claim 4 wherein the file identifier comprises a material identification.

6. A method as recited in claim 1 wherein communicating the first request comprises communicating the first request through a broadband network.

7. A method as recited in claim 1 wherein communicating the first request comprises communicating the first request through a wireless broadband network.

8. A method as recited in claim 1 wherein generating a redirection response comprises generating a redirection response having a hash and a size of the content file.

9. A method as recited in claim 1 wherein communicating the redirection response comprises communicating the redirection response through a broadband network.

10. A method as recited in claim 1 wherein communicating the redirection response comprises communicating the redirection response through a wireless broadband network.

11. A method as recited in claim 1 wherein communicating the second request comprises communicating the second request through a broadband network.

12. A method as recited in claim 1 wherein communicating the second request comprises communicating the second request through a wireless broadband network.

13. A method as recited in claim 1 wherein communicating the content file comprises communicating the content file through a broadband network.

14. A method as recited in claim 1 wherein communicating the content file comprises communicating the content file through a wireless broadband network.

15. A method as recited in claim 1 further comprising storing the content file in a memory device within the user device.

16. A method as recited in claim 1 further comprising a communicating a status message from the user device to the content delivery network.

17. A method as recited in claim 1 wherein the status message comprises a completed message or a failed message.

18. A method as recited in claim 1 wherein generating a second request comprises generating a plurality of second requests for different portions of the content file and wherein communicating the second request comprises communicating the plurality of second requests and wherein communicating the content file comprises communicating the content file in response to the plurality of second requests in parallel.

19. A method as recited in claim 1 wherein the user device comprises a digital video recorder.

20. A method as recited in claim 1 wherein the user device comprises a satellite television set top box.

21. A method as recited in claim 1 wherein the user device comprises a cable television set top box.

22. A system comprising:
a content delivery network;
a user device generating a first request for a content file at a user device and communicating the request to the content delivery network;
said content delivery network authenticating the first request, generating a redirection response and communicating the redirection response to the user device;
said user device authenticating the redirection response, generating a second request for the content file in response to the redirection request and communicating the second request from the user device; and
said content delivery network communicating the content file from the content delivery network in response to the second request.

23. A system method as recited in claim 22 wherein the first request comprises a Uniform Resource Locator (URL).

24. A system as recited in claim 22 wherein the first request comprises a URL having a hostname and file identifier.

25. A system as recited in claim 22 wherein the first request comprises a URL having a hostname, directory and file identifier.

26. A system as recited in claim 25 wherein the file identifier comprises a material identification.

27. A system as recited in claim 22 further comprising a broadband network communicating the first request.

28. A system as recited in claim 22 further comprising a wireless broadband network communicating the first request.

29. A system as recited in claim 22 wherein the redirection response comprises a hash and a size of the content file.

30. A system as recited in claim 22 further comprising a broadband network communicating the redirection response.

31. A system as recited in claim 22 further comprising a wireless broadband network communicating the redirection response.

32. A system as recited in claim 22 further comprising a broadband network communicating the second request.

33. A system as recited in claim 22 further comprising a wireless broadband network communicating the second request.

34. A system as recited in claim 22 further comprising a broadband network communicating the content file.

35. A system as recited in claim 22 further comprising a wireless broadband network communicating the second request.

36. A system as recited in claim 22 wherein the user device communicates a status message to the content delivery network.

37. A system as recited in claim 36 wherein the status message comprises a completed message or a failed message.

38. A system as recited in claim 22 wherein the user device comprises a digital video recorder.

39. A system as recited in claim 22 wherein the user device comprises a satellite television set top box.

40. A system as recited in claim 22 wherein the user device comprises a cable television set top box.

* * * * *